(12) United States Patent
Lin (10) Patent No.: US 12,492,748 B2
(45) Date of Patent: Dec. 9, 2025

(54) GEAR SHIFTING ASSEMBLY WITH SOLENOID ACTUATION ARRANGEMENT

(71) Applicant: Shikai Lin, Monterey Park, CA (US)

(72) Inventor: Shikai Lin, Monterey Park, CA (US)

( * ) Notice: Subject to any disclaimer, the term of this patent is extended or adjusted under 35 U.S.C. 154(b) by 0 days.

(21) Appl. No.: 18/419,381

(22) Filed: Jan. 22, 2024

(65) Prior Publication Data
US 2025/0237307 A1    Jul. 24, 2025

(51) Int. Cl.
*F16H 63/30* (2006.01)
*F16D 11/10* (2006.01)
*F16D 27/108* (2006.01)
*F16D 27/118* (2006.01)
*F16H 63/32* (2006.01)

(52) U.S. Cl.
CPC ........... *F16H 63/304* (2013.01); *F16D 11/10* (2013.01); *F16D 27/108* (2013.01); *F16D 27/118* (2013.01); *F16H 63/32* (2013.01); *F16H 2063/305* (2013.01); *F16H 2063/3093* (2013.01)

(58) Field of Classification Search
CPC .... F16D 11/10; F16D 11/14; F16D 2011/008; F16D 2023/141; F16D 27/108; F16D 27/118; F16H 63/04; F16H 63/3023; F16H 63/304; F16H 2063/305; F16H 2063/3093
USPC ...................................... 192/69.62
See application file for complete search history.

(56) References Cited

U.S. PATENT DOCUMENTS 2,624,207 A * 1/1953 Forman ................. B60W 30/18
74/336.5
8,661,925 B2 * 3/2014 Graves .................... F16H 61/30
74/346

FOREIGN PATENT DOCUMENTS

CN    212225897 U  * 12/2020
CN    215567881 U  *  1/2022

* cited by examiner

*Primary Examiner* — Richard M Lorence
(74) *Attorney, Agent, or Firm* — Tsz Lung Yeung (57) ABSTRACT

A gear shifting assembly includes a gear shifting unit and a solenoid actuation arrangement. The gear shifting unit includes a driving member and a driven member. The solenoid actuation arrangement includes a solenoid actuator, a transmission arm, and an engaging ring connected to the driving member and the transmission arm. The solenoid valve can be operated between a first state and a second state, wherein in the first state, the solenoid actuator is switched to drive the transmission arm to move the engaging ring to drive the driving member to engage with the driven member, such that the driving member and the driven member can be driven to rotate correspondingly. In the second state, the solenoid actuator is switched to drive the driving member to disengage from the driven member so as to allow the driving member and the driven member to rotate at different speeds.

10 Claims, 9 Drawing Sheets

GEAR SHIFTING ASSEMBLY WITH SOLENOID ACTUATION ARRANGEMENT

BACKGROUND OF THE PRESENT INVENTION

Field of Invention

The present invention relates to a gear shifting device, and more particularly to a gear shifting assembly which is actuated by a solenoid actuator.

Description of Related Arts

Virtually all automobiles utilize some sorts of clutching devices to allow selectively engagement between the engines and the transmission assemblies. Most clutching devices utilize hydraulic actuation for controlling their operations. Common clutching technologies include automatic transmission (AT) clutches, dual clutch transmission (DCT) clutches, Continuously Variable Transmission (CVT) clutches, Automatic Mechanical Transmission (AMT) clutches.

A major disadvantage of these conventional clutches is that they are actuated by hydraulic systems or through servo motors. These involve complicated components and structures. The performance of these clutches is usually not reliable, and their response time not satisfactory.

SUMMARY OF THE PRESENT INVENTION

Certain variations of the present invention provide a gear shifting assembly which is actuated by a solenoid actuator in an efficient and effective manner.

In one aspect of the present invention, it provides a gear shifting assembly for an automobile having an engine and a transmission assembly, comprising:
a gear shifting unit, which comprises:
a driving member adapted for connecting to the engine of the automobile, the driving member comprising a plurality of engaging pins;
a driven member adapted for connecting to the transmission assembly of the automobile, the driven member comprising a plurality of engaging slots positioned and sized to correspond to the engaging pins respectively;
a solenoid actuation arrangement, which comprises:
a solenoid actuator; and
a transmission arm having a first end portion coupled to the solenoid actuator, and a second end portion extending from the first end portion; and
an engaging ring which is connected to the driving member and arranged to be driven by the second end portion of the transmission arm, the solenoid actuator being operated between a first state and a second state, wherein in the first state, the solenoid actuator is switched to drive the transmission arm to move the engaging ring to drive the driving member to engage with the driven member through engagement between the engaging pins and the engaging slots, such that when the driving member is driven to rotate, the driven member is also driven to rotate correspondingly, wherein in the second state, the solenoid actuator is switched to drive the transmission arm to move the engaging ring and the driving member to disengage from the driven member, so as to allow the driving member and the driven member to rotate at different speeds respectively.

This summary presented above is provided merely to introduce certain concepts and not to identify any key or essential features of the claimed subject matter.

DETAILED DESCRIPTIONS OF THE PRESENT INVENTION

The following detailed description of the preferred embodiment is the preferred mode of carrying out the invention. The description is not to be taken in any limiting sense. It is presented for the purpose of illustrating the general principles of the present invention.

In the following descriptions, it should also be appreciated that the terms "arrange" and "set" in the following description refer to the connecting relationship in the accompanying drawings for easy understanding of the present invention. For example, the "arrange" and "set" may refer to one element directly or indirectly set or arrange on another element. Therefore, the above terms should not be an actual connection limitation of the elements of the present invention.

It should also be appreciated that the terms "center", "length", "width", "thickness", "top", "bottom", "front", "rear", "left", "right", "vertical", "horizontal", "upper", "lower", "interior", and "exterior" in the following description refer to the orientation or positioning relationship in the accompanying drawings for easy understanding of the present invention without limiting the actual location or orientation of the present invention. Therefore, the above terms should not be an actual location limitation of the elements of the present invention.

Moreover, it should be appreciated that the terms "first", "second", "one", "a", and "an" in the following description refer to "at least one" or "one or more" in the embodiment.

In particular, the term "a" in one embodiment may refer to "one" while in another embodiment may refer to "more than one". Therefore, the above terms should not be an actual numerical limitation of the elements of the present invention.

It should be appreciated that the terms "install", "connect", "couple", and "mount" in the following description refer to the connecting relationship in the accompanying drawings for easy understanding of the present invention. For example, the connection may refer to permanent connection or detachable connection. Therefore, the above terms should not be an actual connection limitation of the elements of the present invention.

Referring to FIG. 1 to FIG. 9 of the drawings, a gear shifting assembly according to a preferred embodiment of the present invention is illustrated. The gear shifting assembly may be used in an automobile having an engine, a transmission assembly connecting to four wheels of the automobile. The purpose of the gear shifting assembly is to allow selective engagement between the engine and the transmission assembly, so that the engine and the wheels may rotate at different speeds. Broadly, the gear shifting assembly may comprise a gear shifting unit 10 and a solenoid actuation arrangement 20.

The gear shifting unit 10 may comprise a driving member 11 and a driven member 12. The solenoid actuation arrangement 20 may comprise a solenoid actuator 21, a transmission arm 22, and an engaging ring 23.

The driving member 11 may be adapted for connecting to the engine 100 of the automobile. The driving member 11 may comprise a plurality of engaging pins 111.

The driven member 12 may be adapted for connecting to the transmission assembly 200 of the automobile. The driven member 12 may comprise a plurality of engaging slots 121 positioned and sized to correspond to the engaging pins 111 of the driving member 11 respectively.

The solenoid actuation arrangement 20 may be coupled to the gear shifting unit 10, and may comprise the solenoid actuator 21, the transmission arm 22 and the engaging ring 23. The transmission arm 22 may have a first end portion 221 coupled to the solenoid actuator 21, and a second end portion 222 extending from the first end portion 221.

The engaging ring 23 may be connected to the driving member 11 and may be arranged to be driven by the second end portion 222 of the transmission arm 22. The solenoid actuator 21 may be operated between a first state and a second state, wherein in the first state, the solenoid actuator 21 may be switched to drive the transmission arm 22 to move the engaging ring 23 to drive the driving member 11 to engage with the driven member 12 through engagement between the engaging pins 111 and the engaging slots 121, such that when the driving member 11 is driven to rotate, the driven member 12 is also driven to rotate correspondingly, wherein in the second state, the solenoid actuator 21 is switched to drive the transmission arm 22 to move the engaging ring 23 and the driving member 11 to disengage from the driven member 12, so as to allow the driving member 11 and the driven member 12 to rotate at different speeds respectively.

According to the preferred embodiment of the present invention, the driving member 11 may be connected to the engine 100 of the automobile, preferably through a driving shaft 30 and other gear assemblies. The engine 100 may provide a power input to the driving member 11. As shown in FIG. 1 to FIG. 5 of the drawings, when the driving shaft 30 is driven to rotate, the driving member 11 may also be driven to rotate accordingly through actuation by the engaging ring 23.

Figure 8:
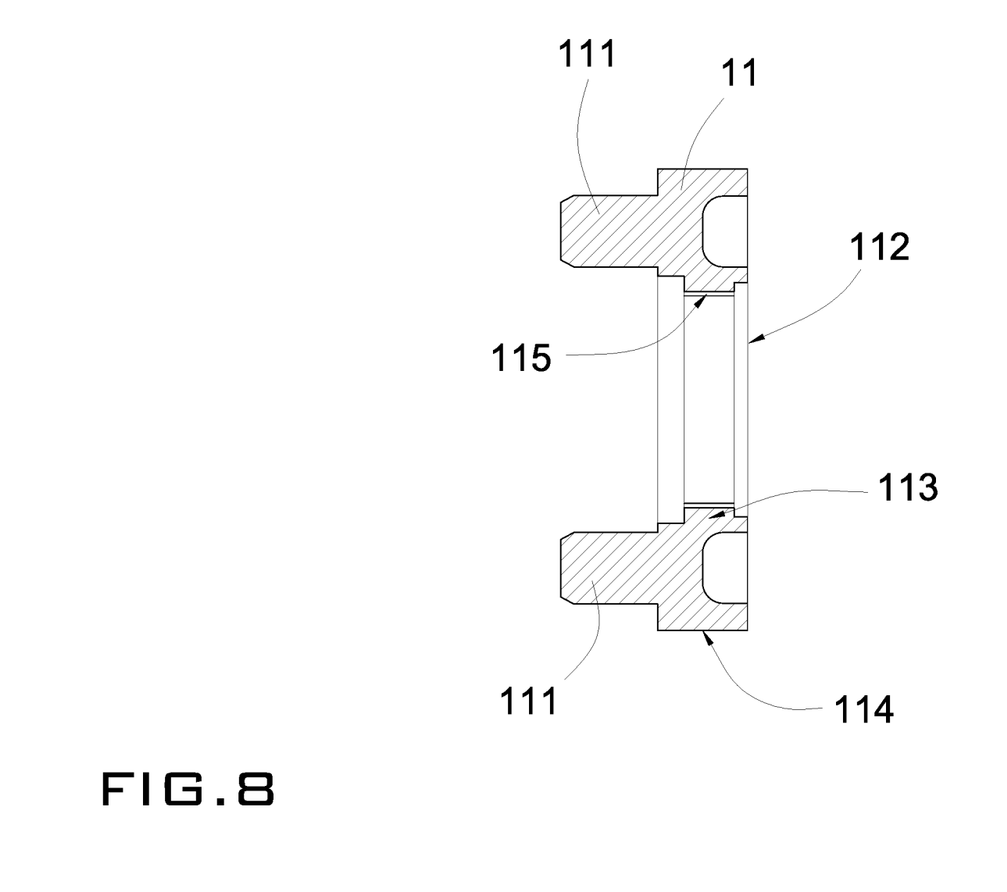
FIG. 8 is a schematic view of a driving member of the gear shifting assembly according to the preferred embodiment of the present invention.

The driving member 11 may have an annular structure and may have a central through hole 112 for allowing the engaging ring 23 to pass therethrough. As shown in FIG. 8 of the drawings, the driving member 11 may have a central portion 113 and a circumferential portion 114 radially extending from the central portion 113. The through hole 112 may be formed on the central portion 113. The engaging pins 111 may extend from the circumferential portion 114 toward the driven member 12. The driving member 11 may be coupled to the engaging ring 23 so as to allow the transmission arm 22 to mechanically actuate a movement of the driving member 11. The driving member 11 may further have a plurality of driving teeth 115 formed on a side boundary of the through hole 112 for engaging with the engaging ring 23.

Figure 1:
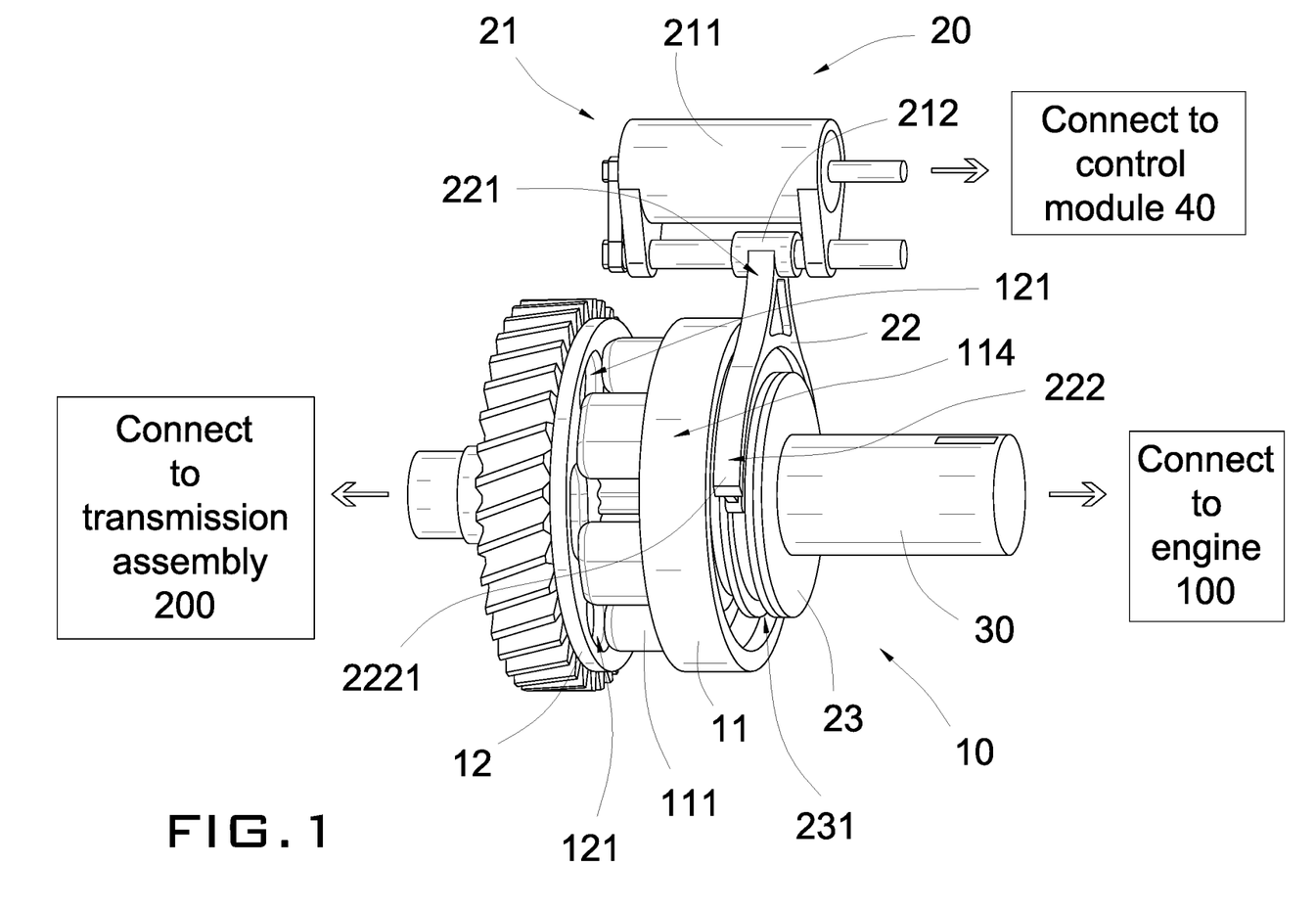
FIG. 1 is a perspective view of a gear shifting assembly according to a preferred embodiment of the present invention, illustrating that a solenoid actuator is being operated in the second state.
Figure 2:
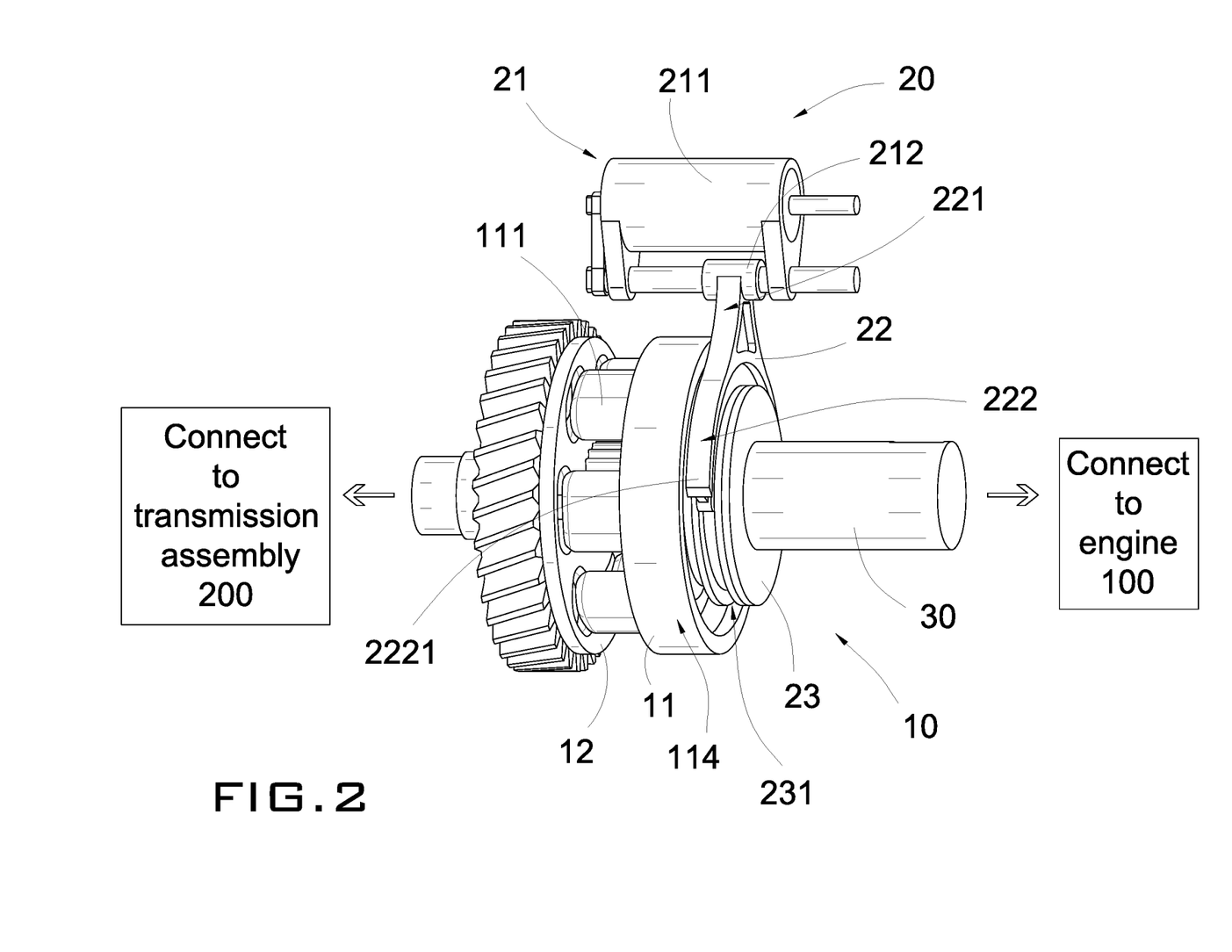
FIG. 2 is a perspective view of a gear shifting assembly according to the preferred embodiment of the present invention, illustrating that the solenoid actuator is being switched between a second state and a first state.

As shown in FIG. 1 of the drawings, when the driving shaft 30 is driven to rotate, the engaging ring 23 and the driving member 11 may also be driven to rotate in a synchronized manner so that the engaging pins 111 may also rotate to the position corresponding to that of the engaging slots 121 of the driven member 12 respectively. The rotation of the driving member 11 and the driven member 12 may be about a longitudinal direction of the gear shifting unit 10.

In this preferred embodiment of the present invention, there are altogether six identical engaging pins 111 extending from the driving member 11 toward the driven member 12. Note that the number of engaging pins 111 may be varied and may depend upon the circumstances in which the present invention is manufactured. The number of the engaging pins 111 and the number of engaging slots 121 may be set to be identical.

Figure 6:
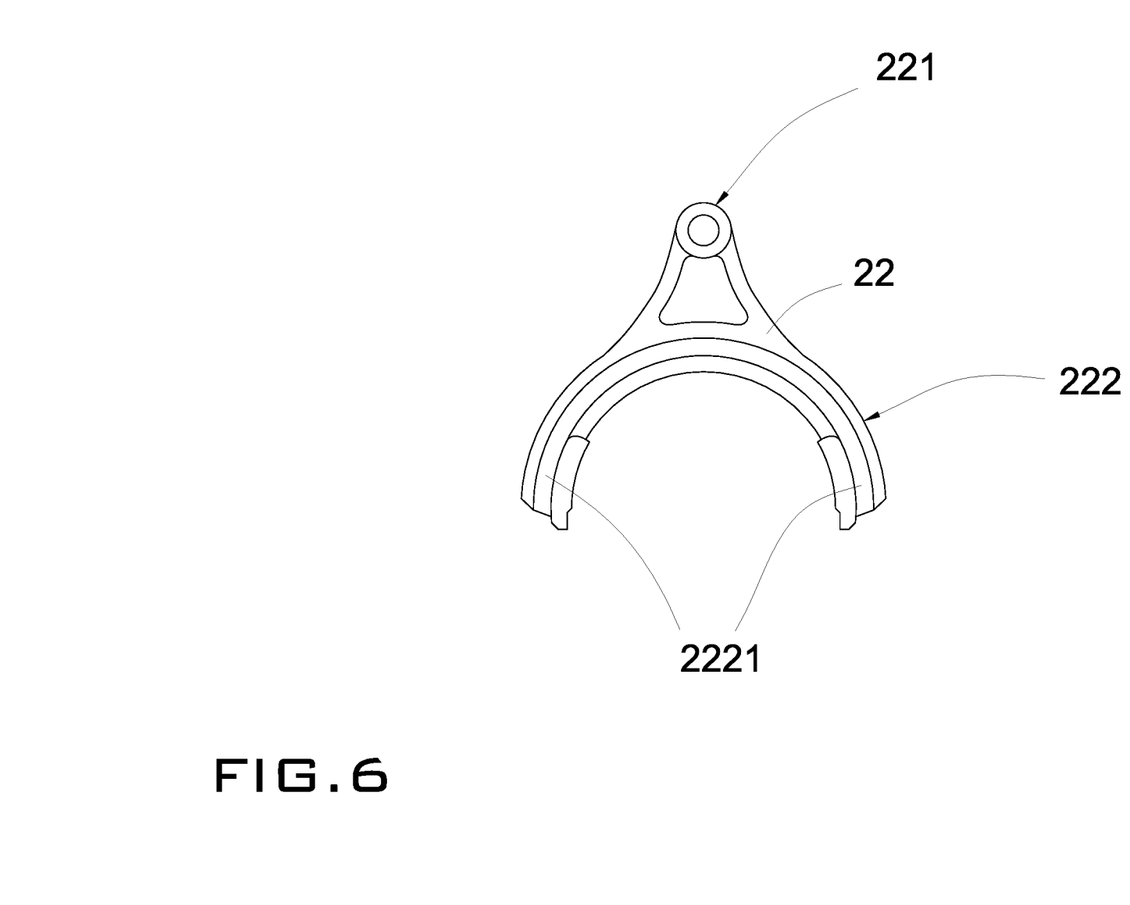
FIG. 6 is a schematic view of a transmission arm of the gear shifting assembly according to the preferred embodiment of the present invention.
Figure 7:
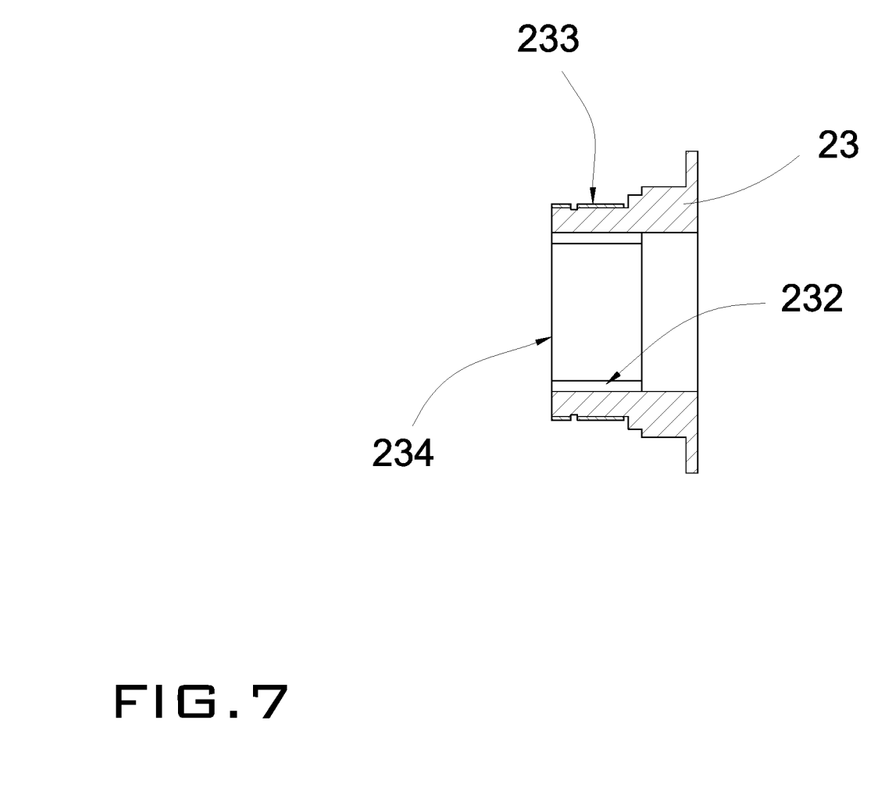
FIG. 7 is a schematic view of an engaging ring of the gear shifting assembly according to the preferred embodiment of the present invention.

The transmission arm 22 may connect the solenoid actuator 21 to the engaging ring 23 of the driving member 11. The transmission arm 22 may have the first end portion 221 and the second end portion 222. The first end portion 221 may be connected to the solenoid actuator 21. The second end portion 222 may be configured as having two arm members 2221 operatively engaging at two different positions in the engaging ring 23. The engaging ring 23 may have a connecting slot 231 in which the two arm members 2221 may operatively engage in the connecting slot 231. The engaging ring 23 may have a substantially circular cross section when viewed from the longitudinal direction of the gear shifting unit 10, wherein the connecting slot 231 may be indently formed along a circumference of the engaging ring 23.

The transmission arm 22 may drive the engaging ring 23 to move along the longitudinal direction of the gear shifting unit 10 and the driving shaft 30. When the engaging ring 23 is driven to rotate, the second end portion 222 of the transmission arm 22 may slide along the connecting slot 231 so that the engaging ring 23 may freely rotate with respect to the transmission arm 22. The two arm members 2221 may downwardly extend from the first end portion 221, wherein each of the arm members 2221 may have a curved contour for fitting the circumference of the connecting slot 231. Each of the arm members 2221 may extend on one side of the engaging ring 23 so that the two arm members 2221 may be positioned opposite to each other with respect to the engaging ring 23. Thus, the transmission arm 22 may be connected to the engaging ring 23 in such a manner that the engaging ring 23 may rotate freely about the longitudinal direction of the gear shifting unit 10, while at the same time the engaging ring 23 may be driven to move along the longitudinal direction of the gear shifting unit 10 for driving the driving member 11 to move correspondingly.

Figure 4:
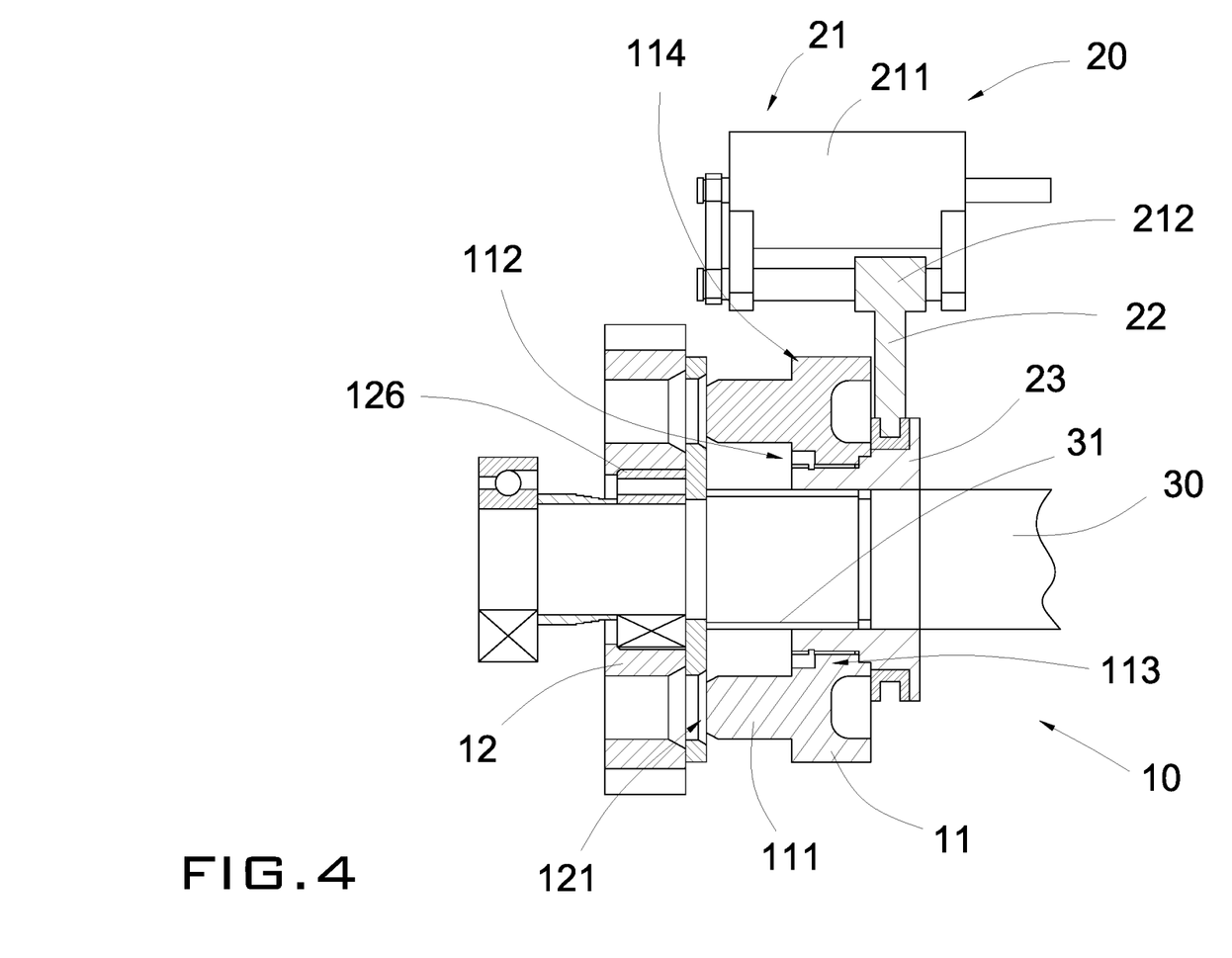
FIG. 4 is a sectional side view of the gear shifting assembly according to the preferred embodiment of the present invention.
Figure 5:
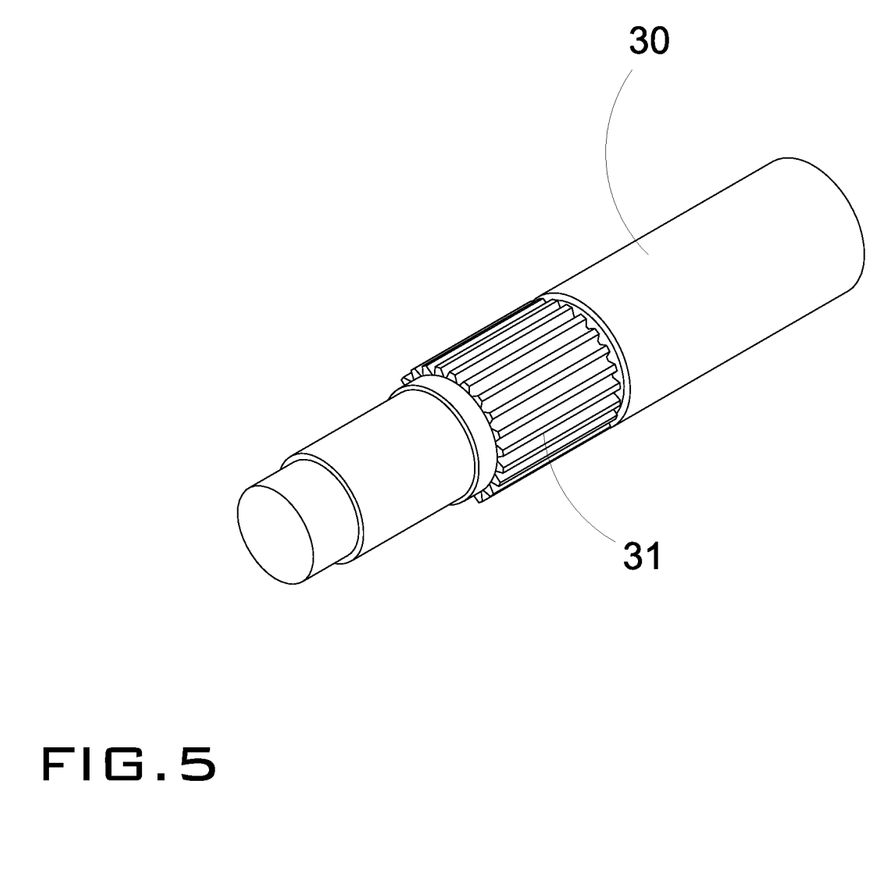
FIG. 5 is a perspective view of a driving shaft of the gear shifting assembly according to the preferred embodiment of the present invention.

As shown in FIG. 4 to FIG. 5 of the drawings, the driving shaft 30 may have a plurality of coupling teeth 31 for engaging with the engaging ring 23 so that when the driving shaft 30 is driven to rotate, the driving shaft 30 may drive the engaging ring 23 to rotate as well. The engagement between the driving shaft 30 and the engaging ring 23 may be accomplished through a plurality of inner engaging teeth 232. As shown in FIG. 7 of the drawings, the engaging ring 23 may be configured as having an annular structure and nay further have a through engaging hole 234, wherein the inner engaging teeth 232 may be formed on an inner boundary of the engaging hole 234. The driving shaft 30 may be arranged to pass through the engaging hole 234 such that the coupling teeth 31 may engage with the inner engaging teeth 232.

Moreover, the engaging ring 23 may be engaged with the driving member 11 preferably through a plurality of outer engaging teeth 233 so that when the engaging ring 23 is driven to rotate, the driving member 11 may also be driven to rotate. As shown in FIG. 7 and FIG. 8 of the drawings, the engaging member 23 may be arranged to pass through the central through hole 112 of the driving member 11 so that the outer engaging teeth 233 may engage with the driving teeth 115. Thus, when the driving shaft 30 is driven to rotate, the driving shaft 30 may drive the engaging member 23 to rotate and the engaging member 23 may drive the driving member 11 to rotate as well about the longitudinal axis of the gear shifting unit 10.

The transmission arm 22 may drive the driving member 11 to linearly move along a longitudinal direction of the gear shifting unit 10 without hindering a rotational movement of the driving member 11.

Figure 9:
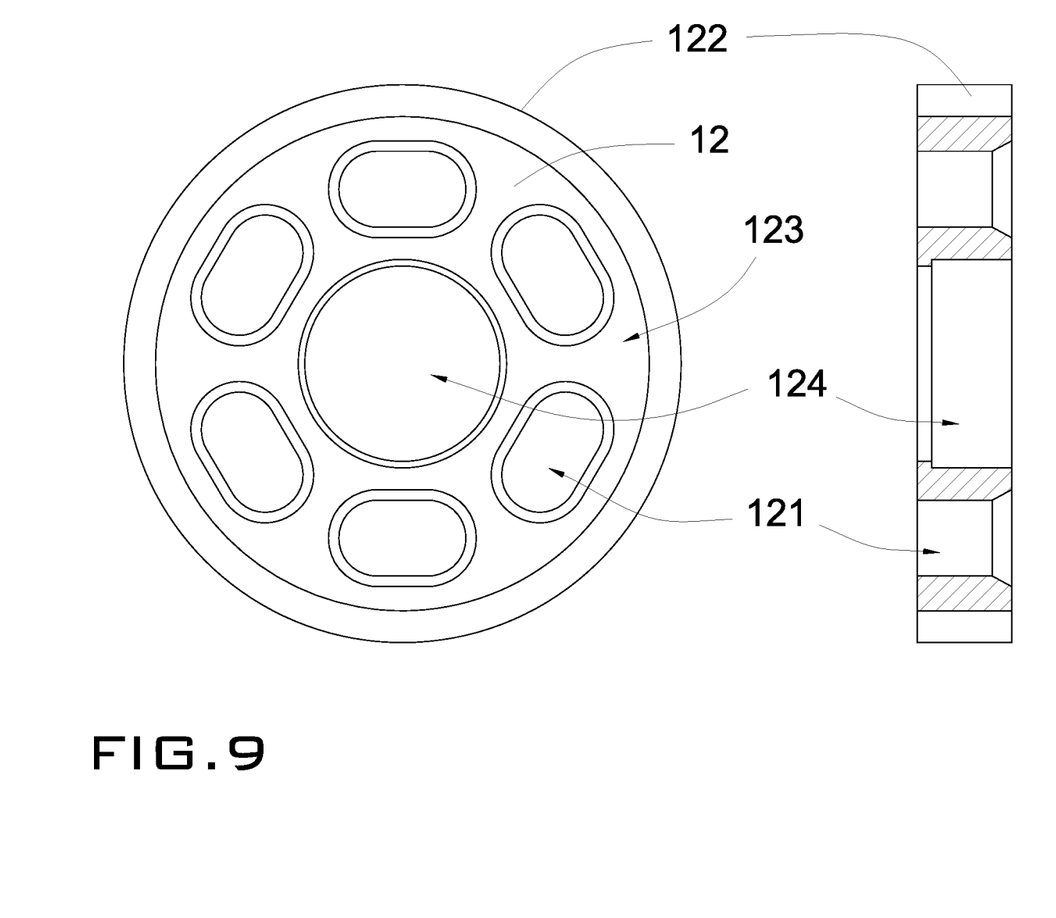
FIG. 9 is a schematic view of a driven member of the gear shifting assembly according to the preferred embodiment of the present invention.

On the other hand, the driven member 12 may be connected to the transmission assembly 200 of the automobile, possibly through gears. The driven member 12 may have an annular structure, and may have a plurality of teeth 122 formed on a circumference of the driven member 12. Each of the teeth 122 may outwardly and radially extend from the circumference of the driven member 12. The teeth 122 may be connected to the transmission assembly 200 or other intervening mechanical components of the automobile. Thus, the driven member 12 may be considered as a gear.

The engaging slots 121 may be formed on a rear side 123 of the driven member 12 and may be positioned corresponding to that of the engaging pins 111 respectively. The number of the engaging slots 121 may be identical to that of the engaging pins 111. As shown in FIG. 9 of the drawings, the driven member 12 may also have a through hole 124.

The driving shaft 30 may extend to the driven member 12 and may connect to the driven member 12 through a ball bearing 126. As such, when the driving shaft 30 is driven to rotate, the driving shaft 30 may rotate without driving the driven member 12 to rotate. However, when the engaging pins 111 engage with the engaging slots 121 respectively, the rotation of the driving member 11 may drive the driven member 12 to rotate about the driving shaft 30. In other words, the driven member 12 may only be driven to rotate through engagement between the engaging pins 111 and the engaging slots 121.

The solenoid actuator 21 may be positioned outside the gear shifting unit 10 and may comprise a main unit 211 and an actuating latch 212 operatively connected to the main unit 211. The main unit 211 may be connected to a control module 40 of the automobile. The control module 40 may be incorporated in the main processing unit of the automobile for controlling the operation thereof. The actuating latch 212 may be connected to the first end portion 221 of the transmission arm 22 and may be actuated to move between two positions which may correspond to the first state and the second state respectively.

When switching between the first state and the second state, the actuating latch 212 may move linearly and substantially parallel to a longitudinal direction of the gear shifting unit 10. Thus, when the actuating latch 212 is driven to move, the first end portion 221 of the transmission arm 21 may also be driven to move along a longitudinal direction of the gear shifting unit 10. This in turn may drive the second end portion 222 of the transmission arm 22 and the entire driving member 11 to move correspondingly. The engaging ring 23 may also be driven to move along a longitudinal direction of the gear shifting unit 10 for selectively driving the driving member 11 to engage to or disengaging from the driven member 12 through the engaging pins 111 and the engaging slots 121.

The operation of the present invention may be described as follows: the solenoid actuator 21 may be operated between the first state and the second state. When the solenoid actuator 21 is in the second state, the solenoid actuator 21 may be switched to drive the transmission arm 22 to move the engaging ring 23 and the driving member 11 to disengage from the driven member 12. When the driving shaft 30 is driven to rotate, the driving member 11 is also driven to rotate in a synchronized manner. However, the driving member 11 and the driven member 12 are disengaged, the driving member 11 and the driven member 12 may rotate at different speeds respectively. Note that the driving shaft 30 may be rotating, but the driven member 12 may be kept stationary because of the ball bearing 126.

Figure 3:
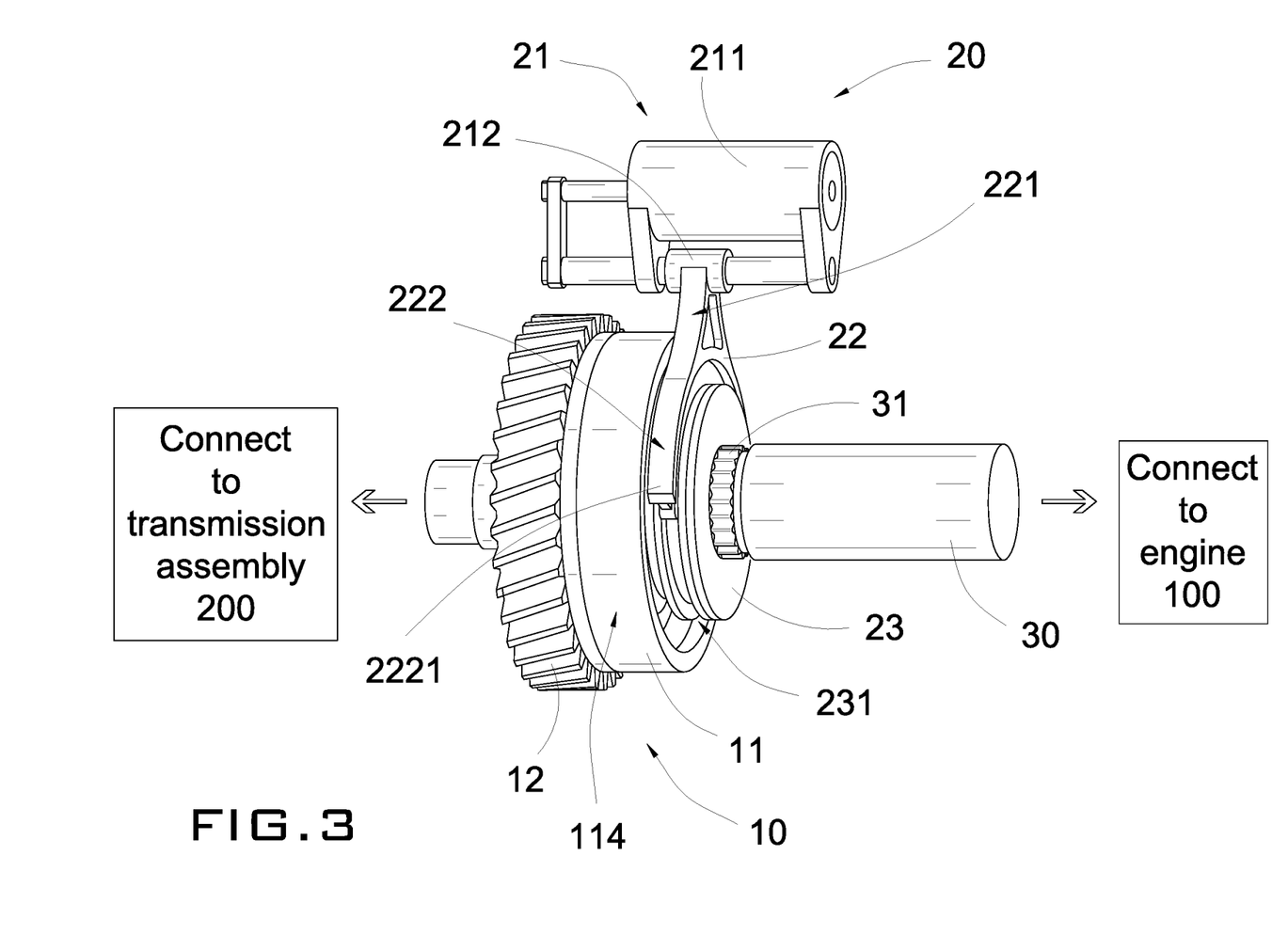
FIG. 3 is a perspective view of a gear shifting assembly according to the preferred embodiment of the present invention, illustrating that a solenoid actuator is being operated in the first state.

When it is at the first state, the solenoid actuator 21 may be switched to drive the transmission arm 22 to move the engaging ring 23 to drive the driving member 11 to engage with the driven member 12 through engagement between the engaging pins 111 and the engaging slots 121, such that when the driving member 11 is driven to rotate, the driven member 12 is also driven to rotate correspondingly. In this first state of operation, the teeth 122 of the driven member 12 may be arranged to output power originated from the engine 100.

The present invention, while illustrated and described in terms of a preferred embodiment and several alternatives, is not limited to the particular description contained in this specification. Additional alternative or equivalent components could also be used to practice the present invention.

What is claimed is:

1. A gear shifting assembly for an automobile having an engine and a transmission assembly, comprising:
    a gear shifting unit, which comprises:
    a driving member adapted for connecting to the engine of the automobile, the driving member comprising a plurality of engaging pins; and
    a driven member adapted for connecting to the transmission assembly of the automobile, the driven member comprising a plurality of engaging slots positioned and sized to correspond to the engaging pins respectively; and
    a solenoid actuation arrangement, which comprises:
    a solenoid actuator;
    a transmission arm having a first end portion coupled to the solenoid actuator, and a second end portion extending from the first end portion; and
    an engaging ring which is connected to the driving member and arranged to be driven by the second end portion of the transmission arm, the solenoid actuator being operated between a first state and a second state, wherein in the first state, the solenoid actuator is switched to drive the transmission arm to move the engaging ring linearly to drive the driving member to engage with the driven member through engagement between the engaging pins and the engaging slots, such that when the driving member is driven to rotate, the driven member is also driven to rotate correspondingly, wherein in the second state, the solenoid actuator is switched to drive the transmission arm to move the engaging ring and the driving member to disengage from the driven member, so as to allow the driving member and the driven member to rotate at different speeds respectively, wherein the driving member has an annular structure and a central through hole for allowing the engaging ring to pass therethrough, the driving member further having a central portion and a circumferential portion radially extending from the central portion, the through hole being formed on the central portion, while the engaging pins extending from the circumferential portion toward the driven member, the driving member further having a plurality of driving teeth formed on a side boundary of the through hole for engaging with the engaging ring.

2. The gear shifting assembly, as recited in claim 1, wherein the gear shifting unit further comprises a driving shaft extending through the engaging ring, the driving member and the driven member, wherein when the driving shaft is driven to rotate, the engaging ring and the driving member are also be driven to rotate in a synchronized manner.

3. The gear shifting assembly, as recited in claim 2, wherein the first end portion of the transmission arm is connected to the solenoid actuator, while the second end portion has two arm members operatively engaging at two different positions on the engaging ring, the engaging ring further has a connecting slot in which the two arm members of the transmission arm are arranged to operatively engage in the connecting slot, in such a manner that when the engaging ring is driven to rotate, the arm members of the transmission arm are arranged to slide along the connecting slot so that the engaging ring is arranged to freely rotate with respect to the transmission arm.

4. The gear shifting assembly, as recited in claim 3, wherein each of the two arm members downwardly extends from the first end portion, and has a curved contour for fitting a circumference of the connecting slot, each of the arm members extending on one side of the engaging ring so that the two arm members are positioned opposite to each other with respect to the engaging ring.

5. The gear shifting assembly, as recited in claim 4, wherein the driving shaft has a plurality of coupling teeth, while the engaging ring further has a through engaging hole and a plurality of inner engaging teeth formed on an inner boundary of the engaging hole for engaging with the coupling teeth of the driving shaft, so that when the driving shaft is driven to rotate, the driving shaft is arranged to drive the engaging ring to rotate in a synchronized manner.

6. The gear shifting assembly, as recited in claim 5, wherein the engaging member has a plurality of outer engaging teeth, wherein the engaging member is arranged to pass through the central through hole of the driving member so that the outer engaging teeth are arranged to engage with the driving teeth of the driving member.

7. The gear shifting assembly, as recited in claim 6, wherein the driven member has an annular structure, and a plurality of teeth formed on a circumference thereof, each of the teeth of the driven member outwardly and radially extending from the circumference of the driven member.

8. The gear shifting assembly, as recited in claim 7, wherein the solenoid actuator comprises a main unit and an actuating latch operatively connected to the main unit and the first end portion of the transmission arm, the actuating latch is arranged to move linearly and substantially parallel to a longitudinal direction of the gear shifting unit, so that when the actuating latch is driven to move, the first end portion and the second end portion of the transmission arm are also be driven to move along a longitudinal direction of the gear shifting unit.

9. The gear shifting assembly, as recited in claim 1, wherein the engaging ring has a plurality of outer engaging teeth, wherein the engaging ring is arranged to pass through the central through hole of the driving member so that the outer engaging teeth are arranged to engage with the driving teeth of the driving member.

10. The gear shifting assembly, as recited in claim 1, wherein the solenoid actuator comprises a main unit and an actuating latch operatively connected to the main unit and the first end portion of the transmission arm, the actuating latch is arranged to move linearly and substantially parallel to a longitudinal direction of the gear shifting unit, so that when the actuating latch is driven to move, the first end portion and the second end portion of the transmission arm are also be driven to move along a longitudinal direction of the gear shifting unit.

* * * * *